United States Patent
Hagiwara et al.

(10) Patent No.: US 12,384,388 B2
(45) Date of Patent: Aug. 12, 2025

(54) DRIVING ASSISTANCE DEVICE, VEHICLE, AND DRIVING ASSISTANCE METHOD

(71) Applicant: HONDA MOTOR CO., LTD., Tokyo (JP)

(72) Inventors: Naoya Hagiwara, Tokyo (JP); Takahiro Kurehashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 529 days.

(21) Appl. No.: 17/675,012

(22) Filed: Feb. 18, 2022

(65) Prior Publication Data
US 2022/0289210 A1    Sep. 15, 2022

(30) Foreign Application Priority Data
Mar. 10, 2021   (JP) .................................. 2021-038559

(51) Int. Cl.
*G08G 1/09*     (2006.01)
*B60W 50/00*    (2006.01)
(Continued)

(52) U.S. Cl.
CPC ........ *B60W 50/0098* (2013.01); *B60W 50/14* (2013.01); *B60W 60/0027* (2020.02);
(Continued)

(58) Field of Classification Search
CPC ............. B60W 40/072; B60W 30/095; B60W 30/18159; B60W 30/0953;
(Continued)

(56) References Cited

U.S. PATENT DOCUMENTS 9,697,733 B1 *  7/2017  Penilla .................... B60L 50/66
10,668,920 B2    6/2020  Fujii
(Continued)

FOREIGN PATENT DOCUMENTS

CN    110271551 A     9/2019
CN    110431037 A    11/2019
(Continued)

OTHER PUBLICATIONS

An English-translated version of JP2018101376A by Akiyama (Year: 2018).*

(Continued)

*Primary Examiner* — Cuong H Nguyen
(74) *Attorney, Agent, or Firm* — Thomas Horstemeyer, LLP

(57) ABSTRACT

A driving assistance device is provided. An acquisition unit configured to acquire data regarding a travel trajectory of another vehicle from the other vehicle by vehicle-to-vehicle communication. A specifying unit configured to specify an intersection position between the travel trajectory of the other vehicle and a travel trajectory of a self-vehicle based on the data acquired by the acquisition unit. A selection unit configured to select data for setting a region based on the intersection position and the travel trajectory of the other vehicle as a monitoring region when performing driving assistance in a case where the intersection position is specifiable by the specifying unit. The selection unit selects data that has been partially deleted from the data acquired by the acquisition unit based on the intersection position.

16 Claims, 10 Drawing Sheets

(51) Int. Cl.
    *B60W 50/14*    (2020.01)
    *B60W 60/00*    (2020.01)
    *G06F 16/23*    (2019.01)
    *G08G 1/16*     (2006.01)
(52) U.S. Cl.
    CPC ...... *G06F 16/2379* (2019.01); *B60K 2360/18* (2024.01); *B60W 2520/04* (2013.01); *B60W 2552/05* (2020.02); *B60W 2554/4045* (2020.02); *B60W 2555/60* (2020.02); *B60W 2556/65* (2020.02)
(58) Field of Classification Search
    CPC .... B60W 30/0956; B60W 40/04; G08G 1/16; H04W 4/025; H04W 4/46; H04W 4/023; G06V 20/56; G06V 20/58; G06V 20/582; G06V 20/584
    USPC .................................. 701/117; 340/905, 907
    See application file for complete search history.

(56)                References Cited

U.S. PATENT DOCUMENTS

| | | | |
|---|---|---|---|
| 10,821,845 | B2 * | 11/2020 | Penilla .................. B60L 3/0015 |
| 11,100,804 | B2 | 8/2021 | Kurehashi |
| 11,338,803 | B2 | 5/2022 | Nakanishi et al. |
| 11,400,927 | B2 | 8/2022 | Deng et al. |
| 11,427,194 | B2 | 8/2022 | Fujii |
| 11,500,380 | B2 | 11/2022 | Wray et al. |
| 11,878,422 | B2 * | 1/2024 | Oyekanlu ........ G05B 19/41895 |
| 2016/0368492 | A1 | 12/2016 | Al-Stouhi |
| 2018/0345960 | A1 | 12/2018 | Fujii |
| 2019/0164422 | A1 | 5/2019 | Bai et al. |
| 2019/0232958 | A1 | 8/2019 | Deng et al. |
| 2020/0255003 | A1 | 8/2020 | Fujii |
| 2021/0039649 | A1 | 2/2021 | Yu |
| 2021/0197813 | A1 * | 7/2021 | Houston ............. B60W 30/143 |
| 2022/0289210 | A1 * | 9/2022 | Hagiwara ......... B60W 50/0098 |
| 2022/0363249 | A1 | 11/2022 | Fujii |

FOREIGN PATENT DOCUMENTS

| | | | | |
|---|---|---|---|---|
| CN | 111319677 | A | | 6/2020 |
| CN | 112319475 | A | | 2/2021 |
| CN | 115123212 | A * | 9/2022 | .......... B60W 30/095 |
| CN | 116238489 | A * | 6/2023 | |
| JP | 2000030198 | A * | 1/2000 | ......... G60K 9/00798 |
| JP | 2006166211 | A * | 6/2006 | |
| JP | 2008-059074 | A | | 3/2008 |
| JP | 2013-033505 | A | | 2/2013 |
| JP | 2018101376 | A * | 6/2018 | |
| JP | 7217306 | B2 * | 2/2023 | .......... B60W 30/095 |
| JP | 7598215 | B2 * | 12/2024 | |
| WO | WO-2019093190 | A1 * | 5/2019 | ............ B60W 30/10 |
| WO | WO-2021040144 | A1 * | 3/2021 | ............ B60W 30/16 |

OTHER PUBLICATIONS

An English-translated version of JP2006166211A by Ito et al (Year: 2006).*

Trentin, Vinicius, et al. "Multi-modal interaction-aware motion prediction at unsignalized intersections." IEEE Transactions on Intelligent Vehicles 8.5 (2023): 3349-3365 (Year: 2023).*

Klischat, Moritz Sebastian. Generating Safety-Critical Test Scenarios for Motion Planning Algorithms of Autonomous Vehicles. Diss. Technische Universität München, 2024. (Year: 2024).*

Hu, Di, et al. "Real-time road intersection detection in sparse point cloud based on augmented viewpoints beam model." Sensors 23.21 (2023): 8854. (Year: 2023).*

Japanese Office Action for Japanese Patent Application No. 2021-038559 mailed Nov. 7, 2022 (partially translated).

Office Action for U.S. Appl. No. 17/675,542 mailed Jul. 25, 2024.

Chinese Office Action for Chinese Patent Application No. 202210151713.2 mailed Mar. 18, 2025 (partially translated).

Chinese Office Action for Chinese Patent Application No. 202210140669.5 mailed May 29, 2025 (partially translated).

* cited by examiner

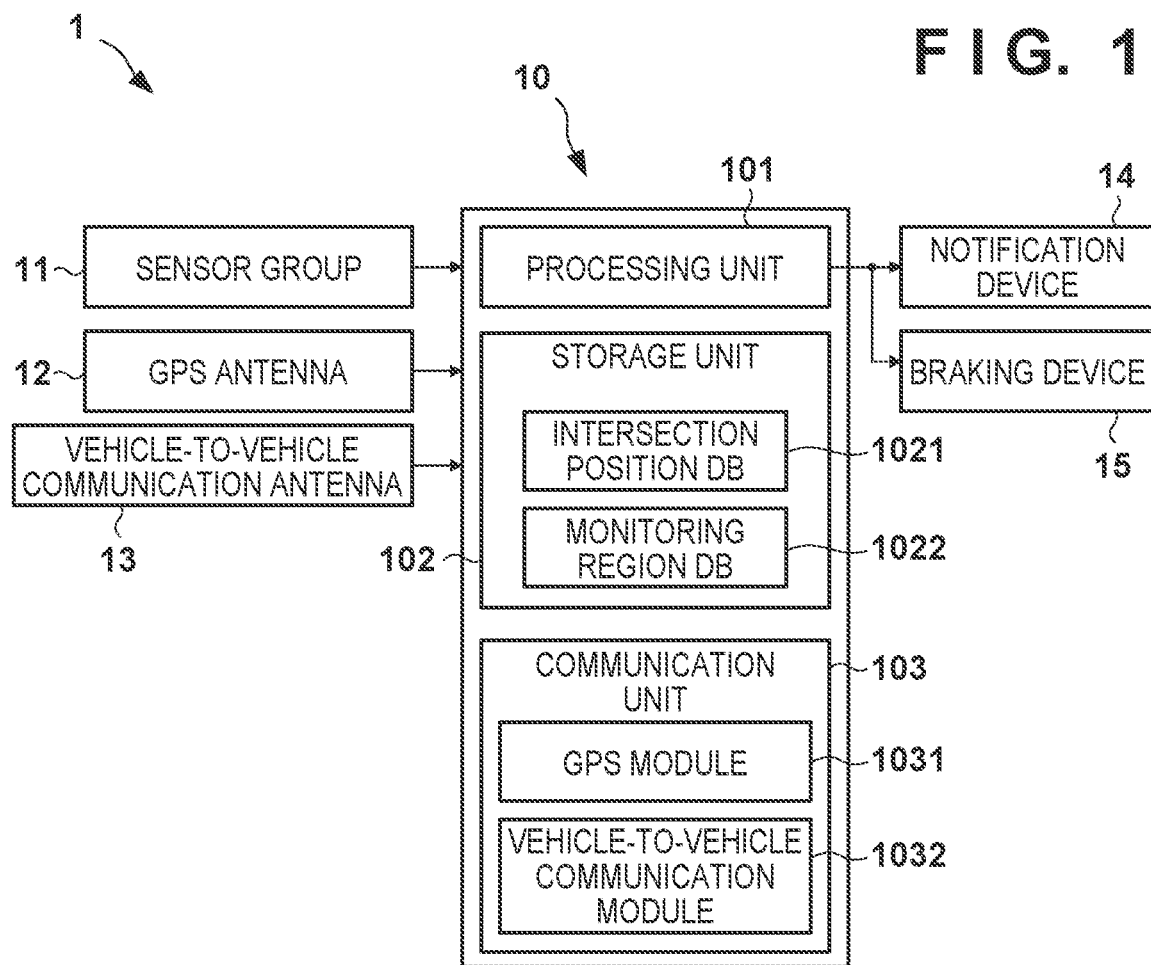

FIG. 7A

| No | TIME | POSITION | DIRECTION | SPEED | INSTRUCT DIRECTION |
|---|---|---|---|---|---|
| 9000 | t0 | 970(x0,y0) | 960(90°) | v0 | — |
| 9001 | t1 | 971(x1,y1) | 961(55°) | v1 | LEFT |
| 9002 | t2 | 972(x2,y2) | 962(0°) | v2 | — |
| 9003 | t3 | 973(x3,y3) | 963(20°) | v3 | — |
| 9004 | t4 | 974(x4,y4) | 964(55°) | v4 | — |
| 9005 | t5 | 975(x5,y5) | 965(80°) | v5 | — |
| 9006 | t6 | 976(x6,y6) | 966(90°) | v6 | — |
| 9007 | t7 | 977(x7,y7) | 967(90°) | v7 | — |

FIG. 7B

| POSITION | DIRECTION | ANGULAR DIFFERENCE | CUMULATIVE VALUE |
|---|---|---|---|
| 51(xc,yc) | 90° | 0° | 0° |
| 976(x6,y6) | 966(90°) | 10° | 10° |
| 975(x5,y5) | 965(80°) | 25° | 35° |
| 974(x4,y4) | 964(55°) | 35° | 70° |
| 973(x3,y3) | 963(20°) | 20° | 90° |
| 972(x2,y2) | 962(0°) | 55° | 145° |
| 971(x1,y1) | 961(55°) | 35° | 180° |
| 970(x0,y0) | 960(90°) | — | — |

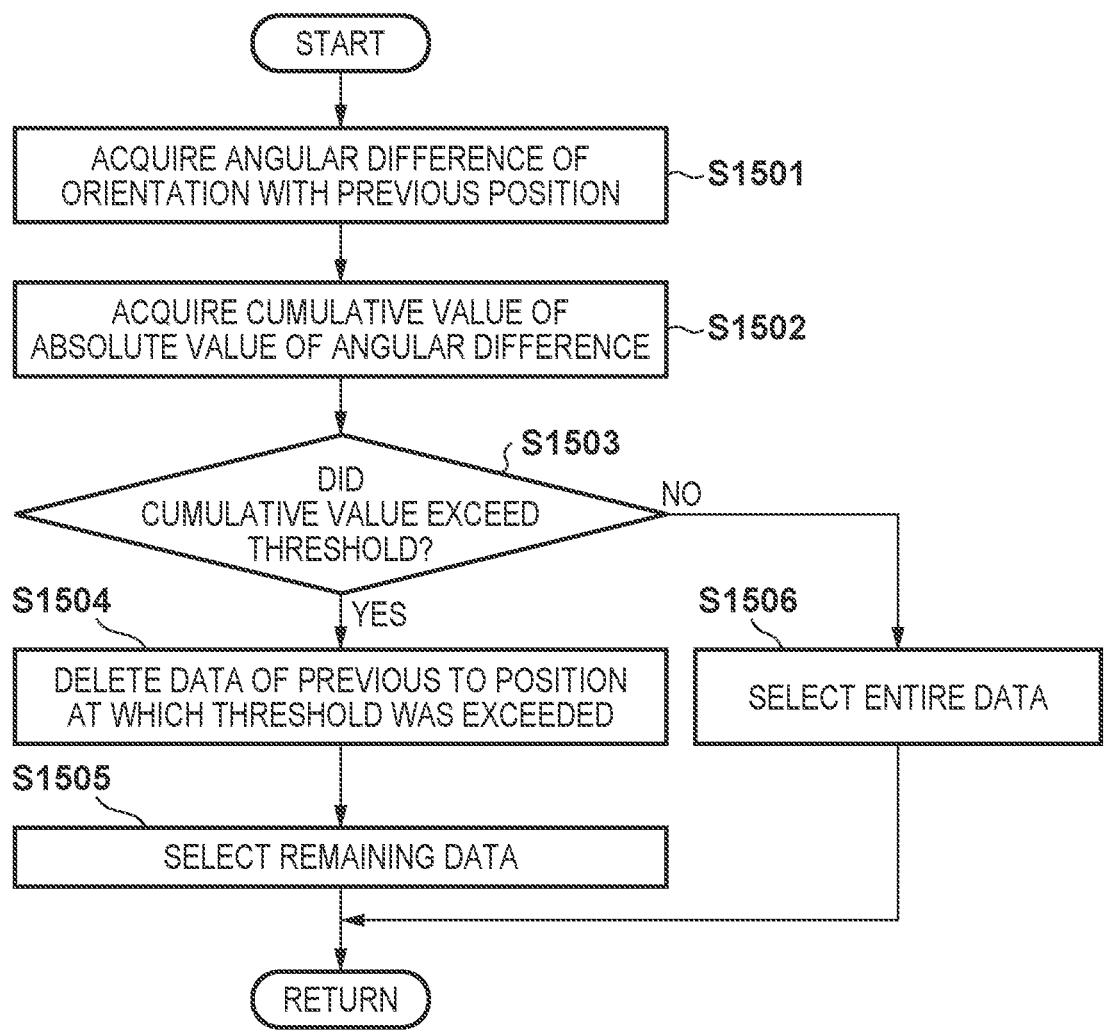

DRIVING ASSISTANCE DEVICE, VEHICLE, AND DRIVING ASSISTANCE METHOD

CROSS-REFERENCE TO RELATED APPLICATION(S)

This application claims priority to and the benefit of Japanese Patent Application No. 2021-038559, filed Mar. 10, 2021, the entire disclosure of which is incorporated herein by reference.

BACKGROUND OF THE INVENTION

Field of the Invention

The present invention relates to a driving assistance device, a vehicle, and a driving assistance method.

Description of the Related Art

A device that prevents a collision with another vehicle or the like at an intersection or the like has been known. Japanese Patent Laid-Open No. 2013-33505 discloses an on-vehicle device that determines a risk of a collision with another vehicle or the like using map information.

SUMMARY OF THE INVENTION

According to one embodiment of the present invention, there is provided a driving assistance device comprising: an acquisition unit acquires data regarding a travel trajectory of another vehicle from the other vehicle by vehicle-to-vehicle communication; a specifying unit specifies an intersection position between the travel trajectory of the other vehicle and a travel trajectory of a self-vehicle based on the data acquired by the acquisition unit; and a selection unit selects data for setting a region based on the intersection position and the travel trajectory of the other vehicle as a monitoring region when performing driving assistance in a case where the intersection position is specifiable by the specifying unit, wherein the selection unit selects data that has been partially deleted from the data acquired by the acquisition unit based on the intersection position.

According to another embodiment of the present invention, there is provided a vehicle on which the driving assistance device of the above embodiment is mounted.

According to still another embodiment of the present invention, there is provided a driving assistance method comprising: acquiring data regarding a travel trajectory of another vehicle from the other vehicle by vehicle-to-vehicle communication; specifying an intersection position between the travel trajectory of the other vehicle and a travel trajectory of a self-vehicle based on the data acquired in the acquiring; and selecting setting data for setting a region based on the intersection position and the travel trajectory of the other vehicle as a monitoring region when performing driving assistance in a case where the intersection position is specifiable in the specifying, wherein, in the selecting, data that has been partially deleted from the data acquired in the acquiring based on the intersection position is selected.

BRIEF DESCRIPTION OF THE DRAWINGS

FIG. 1 is a diagram illustrating a configuration example of a vehicle according to an embodiment;

FIG. 2A is a diagram illustrating a configuration example of an intersection position database (DB);

FIG. 2B is a diagram illustrating a configuration example of a monitoring region DB;

FIG. 7A is a diagram illustrating data acquired from another vehicle;

FIG. 7B is a diagram illustrating an angular difference between each position of another vehicle and a previous position;

FIG. 8 is a flowchart illustrating a processing example of the processing unit;

DESCRIPTION OF THE EMBODIMENTS

Figure 3A:
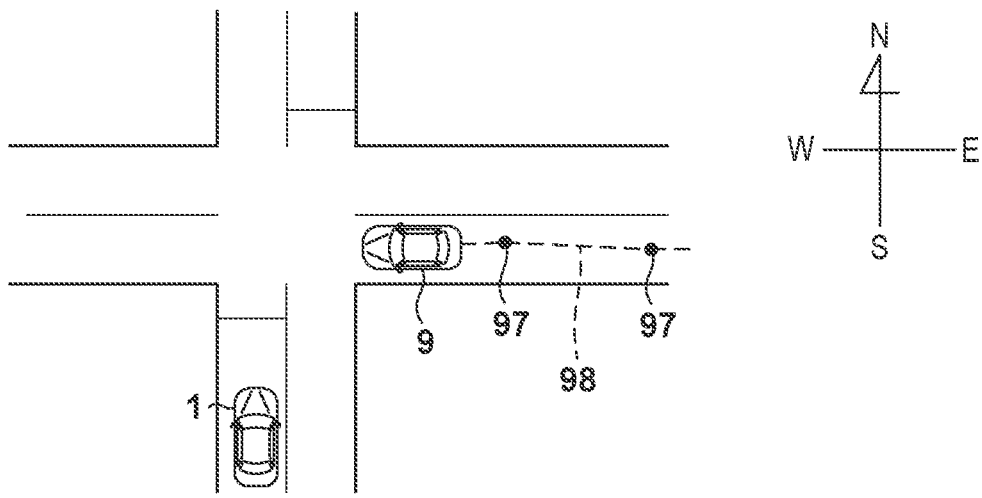
FIG. 3A is a diagram for describing setting of a monitoring region.

Meanwhile, there is a device that performs driving assistance for preventing a collision with another vehicle or the like without using map information. In such a device, for example, a monitoring region for another vehicle is set based on data acquired from the other vehicle by vehicle-to-vehicle communication, and driving assistance may be performed when the other vehicle travels in the set monitoring region. It is desirable that the data used for setting the monitoring region is appropriately selected from the viewpoint of reducing the amount of data stored in the device.

An embodiment of the present invention provides a technique for reducing the amount of data used for setting a monitoring region for another vehicle in driving assistance.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

1. Overall Configuration (FIGS. 1 to 2B)

FIG. 1 is a diagram illustrating a configuration example of a vehicle 1 according to an embodiment. Note that FIG. 1 illustrates a configuration related to features of embodiments to be described later. The vehicle 1 is a vehicle capable of performing driving assistance for preventing a collision with another vehicle or the like without using map information by a control to be described later. The vehicle 1 includes a control device 10, a sensor group 11, a global positioning system (GPS) antenna 12, a vehicle-to-vehicle communication antenna 13, a notification device 14, and a braking device 15.

The control device 10 is, for example, an electronic control unit (ECU), and functions as a driving assistance device that performs a driving assistance control. Although details will be described later, in the present embodiment, the control device 10 performs a driving assistance control by vehicle-to-vehicle communication with another vehicle and processing in the self-vehicle without performing server communication or the like. The control device 10 includes a processing unit 101, a storage unit 102, and a communication unit 103, which are connected by a bus (not illustrated).

The processing unit 101 is a processor as typified by a central processing unit (CPU), and executes a program stored in the storage unit 102. The storage unit 102 is a random access memory (RAM), a read only memory (ROM), a hard disk drive, or the like and stores various data in addition to the program executed by the processing unit 101. The communication unit 103 is a communication interface for communication with an external device.

In the present embodiment, an intersection position database (DB) 1021 and a monitoring region DB 1022 are constructed as databases for performing driving assistance in the storage unit 102.

FIG. 2A is a diagram illustrating a configuration example of the intersection position DB 1021. The intersection position DB 1021 stores information regarding an intersection position registered by processing to be described later. In the present embodiment, the intersection position DB 1021 stores an intersection position ID, a registration date and time, position information, and an entry azimuth in association with each other for each intersection position.

The intersection position ID is an identification number of each intersection position. The registration date and time is a date and time when a target intersection position is registered in the intersection position DB 1021. The position information is information indicating the intersection position, and is indicated by, for example, latitude and longitude. Furthermore, the position information may include information regarding a height such as altitude. The entry azimuth is an azimuth (angle) at which the vehicle 1 is directed at the time of entering the intersection position when the intersection position is registered. In the present embodiment, the azimuth of entry to the intersection is registered with the north direction set to 0°, the east direction set to 90°, the south direction set to 180°, and the west direction set to 270°.

Note that the information stored in the intersection position DB 1021 as illustrated in FIG. 2A is an example, and the information included in the intersection position DB 1021 can be changed as appropriate. In the following description, the intersection position registered in the intersection position DB 1021 may be referred to as a registered intersection position.

FIG. 2B is a diagram illustrating a configuration example of the monitoring region DB 1022. The monitoring region DB 1022 stores information regarding a monitoring region set by processing to be described later. Here, the monitoring region is a region to be monitored for another vehicle when the control device 10 performs driving assistance. That is, the control device 10 performs driving assistance when another vehicle is traveling in the monitoring region. In the present embodiment, the monitoring region DB 1022 stores a monitoring region ID, an intersection position ID, and monitoring region setting information in association with each other for each monitoring region.

The monitoring region ID is an identification number of each monitoring region. In the present embodiment, since the monitoring region is set for the registered intersection position, the monitoring region DB 1022 also includes the intersection position ID of the intersection position corresponding to the monitoring region specified by the monitoring region ID. Monitoring region information is information for setting the monitoring region. For example, the monitoring region information includes time series data of a position of another vehicle used for setting the monitoring region.

The communication unit 103 includes a GPS module 1031 that receives position information and the like of the vehicle 1 from an artificial satellite (GPS satellite) via the GPS antenna 12, and a vehicle-to-vehicle communication module 1032 that receives information from another vehicle via the vehicle-to-vehicle communication antenna 13.

Note that the function of the control device 10 can be implemented by either hardware or software. For example, the function of the control device 10 may be implemented by a central processing unit (CPU) executing a predetermined program using a memory. For example, at least some of the functions of the control device 10 may be implemented by a known semiconductor device such as a programmable logic device (PLD) or an application specific integrated circuit (ASIC). In addition, here, the control device 10 is described as a single element, but the control device 10 may be divided into two or more elements as necessary.

The sensor group 11 includes various sensors mounted on the vehicle 1 and necessary for driving assistance. For example, the sensor group 11 can include an acceleration sensor that detects the acceleration of the vehicle 1, a vehicle speed sensor that detects the speed of the vehicle 1, and the like. Furthermore, for example, the sensor group 11 can include an outside detection sensor such as a camera capable of detecting an object around the vehicle 1, a millimeter wave radar, or a light detection and ranging (LIDAR). The sensor group 11 outputs a detection result to the control device 10.

The GPS antenna 12 receives radio waves for position measurement transmitted from a GPS satellite. The vehicle-to-vehicle communication antenna 13 is an antenna that transmits and receives various data to and from another vehicle. For example, the vehicle-to-vehicle communication antenna 13 may receive data regarding a travel trajectory of another vehicle from the other vehicle.

The notification device 14 is a device that makes a notification for an occupant. For example, the notification device 14 includes a display unit such as a display, and makes a notification for the occupant by displaying information such as a possibility of a collision with another vehicle on the display unit. Furthermore, for example, the notification device 14 includes a voice output unit such as a speaker, and notifies of information such as a possibility of a collision by voice.

The braking device 15 is, for example, a brake, and is a device for performing a braking operation of the vehicle 1. When there is a possibility that the vehicle 1 collides with another vehicle, as driving assistance, the control device 10 may operate the braking device 15 to avoid the collision with another vehicle.

2. Outline of Operation of Control Device 10 (FIGS. 3A to 4B)

In the present embodiment, the control device 10 of the vehicle 1 performs driving assistance without using the map information. Here, the operation performed by the control device 10 is mainly divided into setting of the monitoring region and execution of driving assistance. Specifically, the control device 10 specifies the intersection position where a travel trajectory of the vehicle 1, which is the self-vehicle, and the travel trajectory of another vehicle intersect, and sets the monitoring region based on the specified intersection position. Then, when the vehicle 1 approaches the specified intersection position, the control device 10 performs driving assistance with another vehicle traveling in the monitoring region as a monitoring target. The outline of the setting of the monitoring region and the driving assistance will be described below.

2.1. Setting of Monitoring Region

Figure 3B:
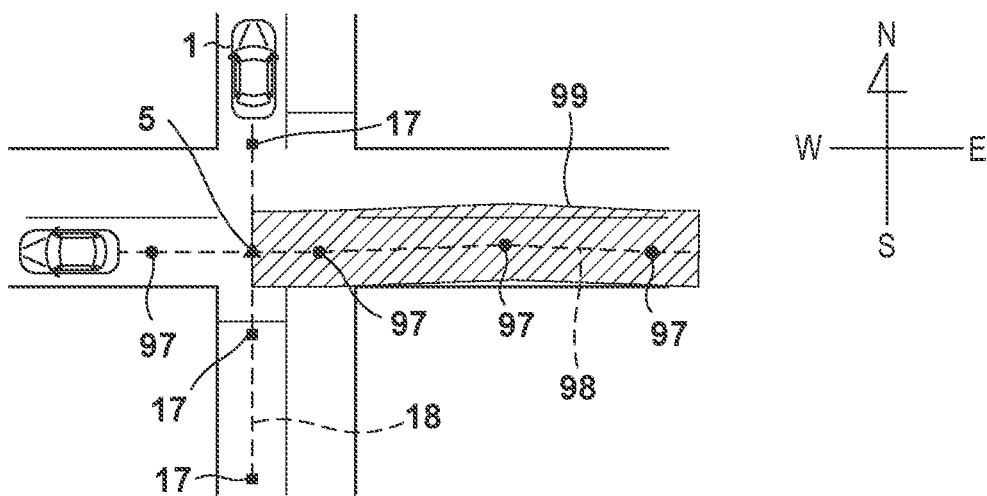
FIG. 3B is a diagram for describing the setting of the monitoring region.

FIGS. 3A and 3B are diagrams for describing the setting of the monitoring region. Here, a case where the travel trajectory of the vehicle 1 that is the self-vehicle and the travel trajectory of a vehicle 9 that is another vehicle intersect will be described.

FIG. 3A illustrates a state before the travel trajectories of the vehicle 1 and the vehicle 9 intersect. Specifically, FIG. 3A illustrates a state in which the vehicle 9 is about to cross the front of the vehicle 1 in a state in which the vehicle 1 is stopped before a stop line.

FIG. 3B illustrates a state after the travel trajectories of the vehicle 1 and the vehicle 9 intersect. Details will be described later, and the control device 10 specifies an intersection position 5 between the travel trajectory of the vehicle 9 and the travel trajectory of the vehicle 1. For example, the control device 10 calculates a travel trajectory 98 of the vehicle 9 based on information regarding a plurality of positions 97 acquired from the vehicle 9. In addition, the control device 10 calculates a travel trajectory 18 of the vehicle 1 based on information regarding a plurality of positions 17 of the vehicle 1 acquired via the GPS antenna 12. Then, an intersection between the travel trajectory 98 and the travel trajectory 18 is specified as the intersection position 5. In addition, the control device 10 stores information regarding the specified intersection position 5 in the intersection position DB 1021.

In addition, FIG. 3B illustrates a monitoring region 99 set based on the travel trajectory and the intersection position 5 of the vehicle 9. As will be described in detail later, the control device 10 sets, as the monitoring region 99, a region having a predetermined width around the travel trajectory 98 in a portion in front of the intersection position 5 of the travel trajectory 98. The predetermined width may be set to, for example, several meters in consideration of a general lane width. In addition, the control device 10 stores information regarding the set monitoring region 99 in the monitoring region DB 1022.

2.2. Driving Assistance

Figure 4A:
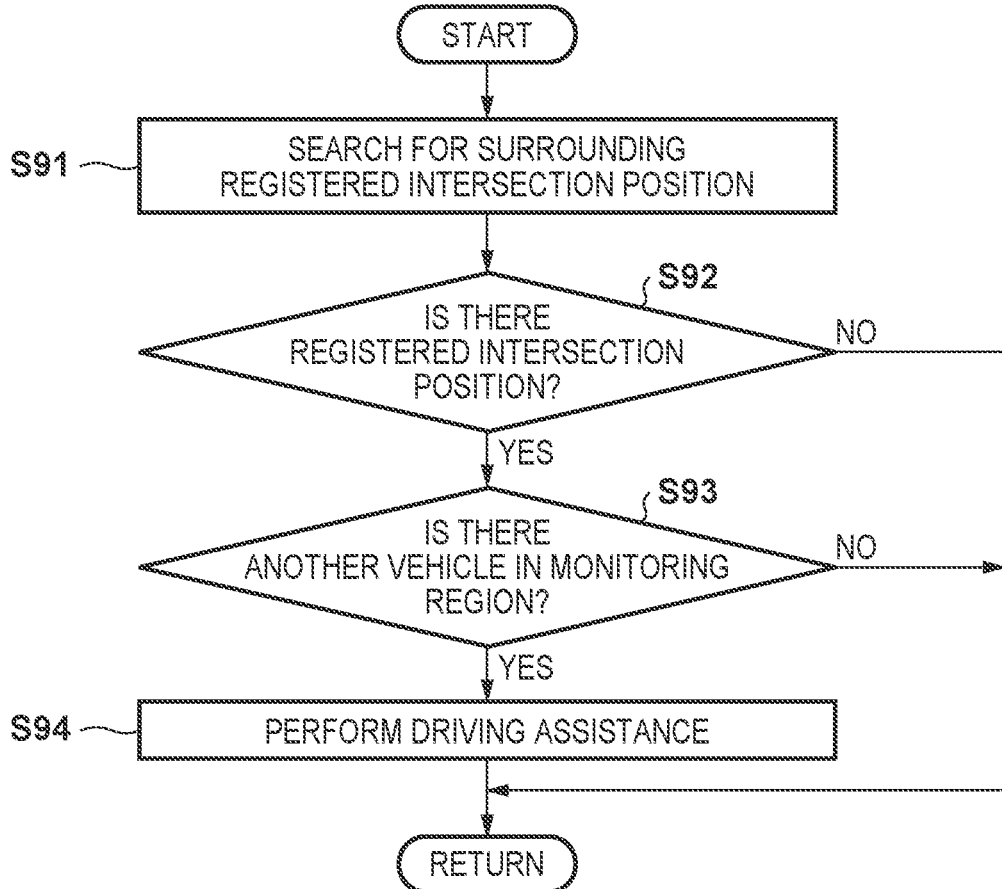
FIG. 4A is a flowchart illustrating a processing example of a processing unit.

FIG. 4A is a flowchart illustrating a processing example of the processing unit 101. FIG. 4A illustrates a processing example of the processing unit 101 when performing driving assistance. For example, this flowchart is implemented by the processing unit 101 reading and executing a program stored in the storage unit 102. Further, for example, this flowchart is repeatedly executed while the vehicle 1 is traveling.

Figure 4B:
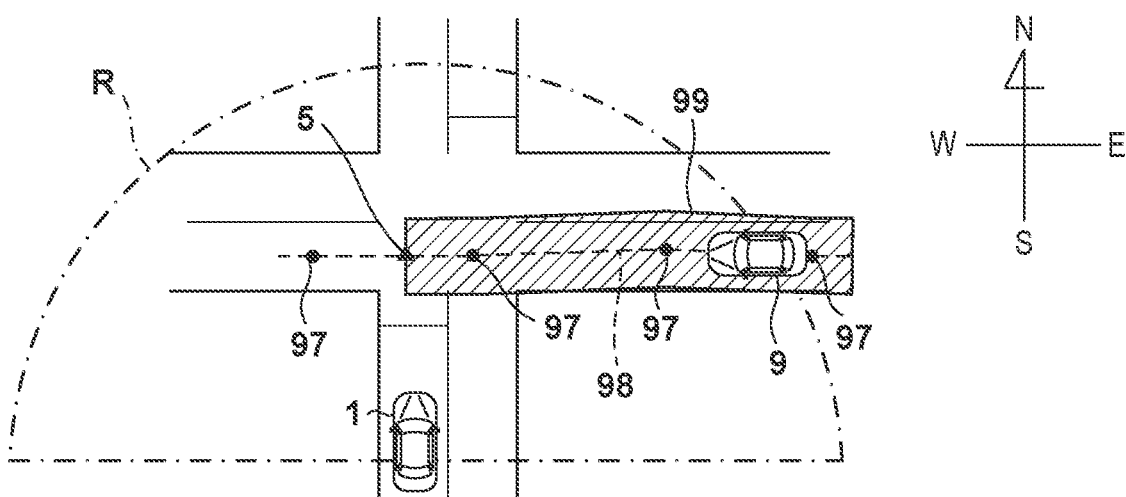
FIG. 4B is a diagram illustrating an example of a situation in which driving assistance of the vehicle is performed.

FIG. 4B is a diagram illustrating an example of a situation in which driving assistance of the vehicle 1 is performed.

Here, a situation in which the vehicle 1 enters the intersection registered in the intersection position DB 1021 is illustrated.

In Step S91 (hereinafter, simply referred to as S91, and the same applies to other steps), the processing unit 101 searches for a registered intersection position around the vehicle 1. For example, the processing unit 101 searches for a registered intersection position within a predetermined range from the vehicle 1 based on the current position of the vehicle 1 acquired by the GPS module 1031 and position information regarding the intersection position registered in the intersection position DB 1021. In the situation illustrated in FIG. 4B, the processing unit 101 searches for an intersection position that is registered in the intersection position DB 1021 and that is within a search range R in front of or on the side of the vehicle 1.

In S92, the processing unit 101 proceeds to S93 in a case where there is a registered intersection position around the vehicle 1 based on the search result of S91, and ends the flowchart in a case where there is no registered intersection position around the vehicle 1. In the situation illustrated in FIG. 4B, since the intersection position 5 is included in the search range R, the processing unit 101 proceeds to S93.

In S93, the processing unit 101 checks whether or not there is another vehicle in the monitoring region, and in a case where there is another vehicle, the processing unit 101 proceeds to S94, and in a case where there is no other vehicle, the processing unit ends the flowchart. For example, the processing unit 101 checks whether or not there is another vehicle in the monitoring region based on position information of another vehicle acquired by the vehicle-to-vehicle communication module 1032 through vehicle-to-vehicle communication. For example, the processing unit 101 checks whether or not there is another vehicle in the monitoring region based on a detection result of the outside detection sensor capable of detecting an object around the vehicle 1. In the situation illustrated in FIG. 4B, since the vehicle 9 is traveling in the monitoring region 99, the processing unit 101 proceeds to S94.

In S94, the processing unit 101 performs driving assistance. For example, the processing unit 101 determines a possibility of a collision between the vehicle 1 and the vehicle 9 based on information such as the position and speed of the vehicle 1, which is the self-vehicle, and the position and speed of the vehicle 9, which is another vehicle. Then, in a case where the possibility of the collision exceeds a threshold, the processing unit 101 causes the notification device 14 to notify the occupant that there is a possibility of a collision. Alternatively, in a case where the possibility of the collision exceeds the threshold, the processing unit 101 may cause the braking device 15 to perform an emergency stop or the like of the vehicle 1. Note that a known technique can be appropriately adopted as an aspect of driving assistance.

As described above, in the present embodiment, the control device 10 is configured to be able to perform driving assistance in a case where another vehicle is present in the monitoring region. Therefore, the control device 10 can perform driving assistance based on the set monitoring region. In addition, since the control device 10 makes, as driving assistance, a notification for the occupant of the self-vehicle, it is possible to urge the occupant to grasp the surrounding situation of the self-vehicle.

3. Control Example (FIGS. 5 to 8)

As described above, the control device 10 performs driving assistance based on the set intersection position 5 and monitoring region 99. It is desirable that data used for setting the monitoring region 99 is appropriately selected from the viewpoint of reducing the amount of data stored in the storage unit 102. Therefore, in the present embodiment, the amount of data used for setting the monitoring region 99 is reduced by deleting a part of the data acquired from another vehicle by the processing as described below.

3.1. Intersection Position Registration Processing

Figure 5:
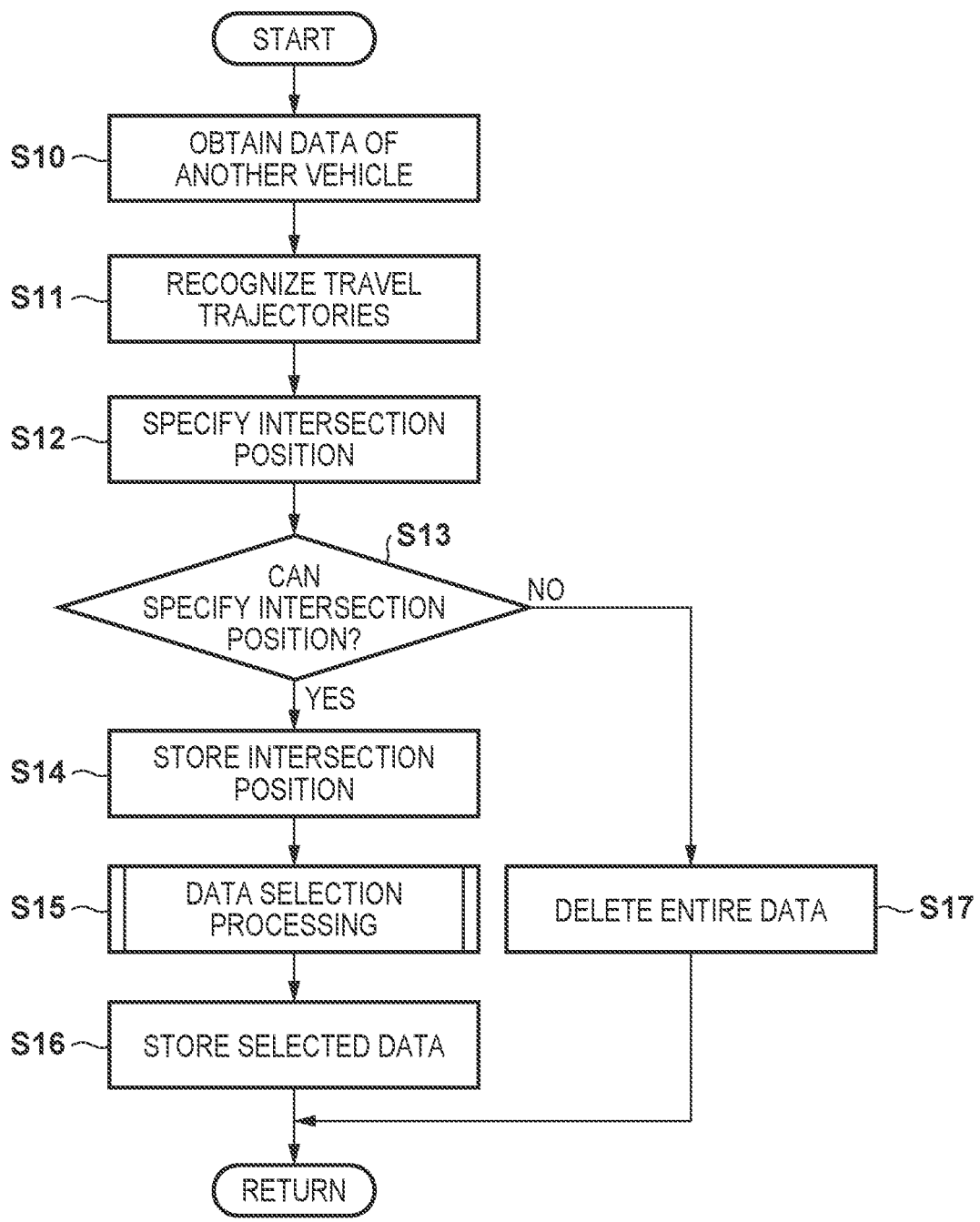
FIG. 5 is a flowchart illustrating a processing example of the processing unit.
Figure 6:
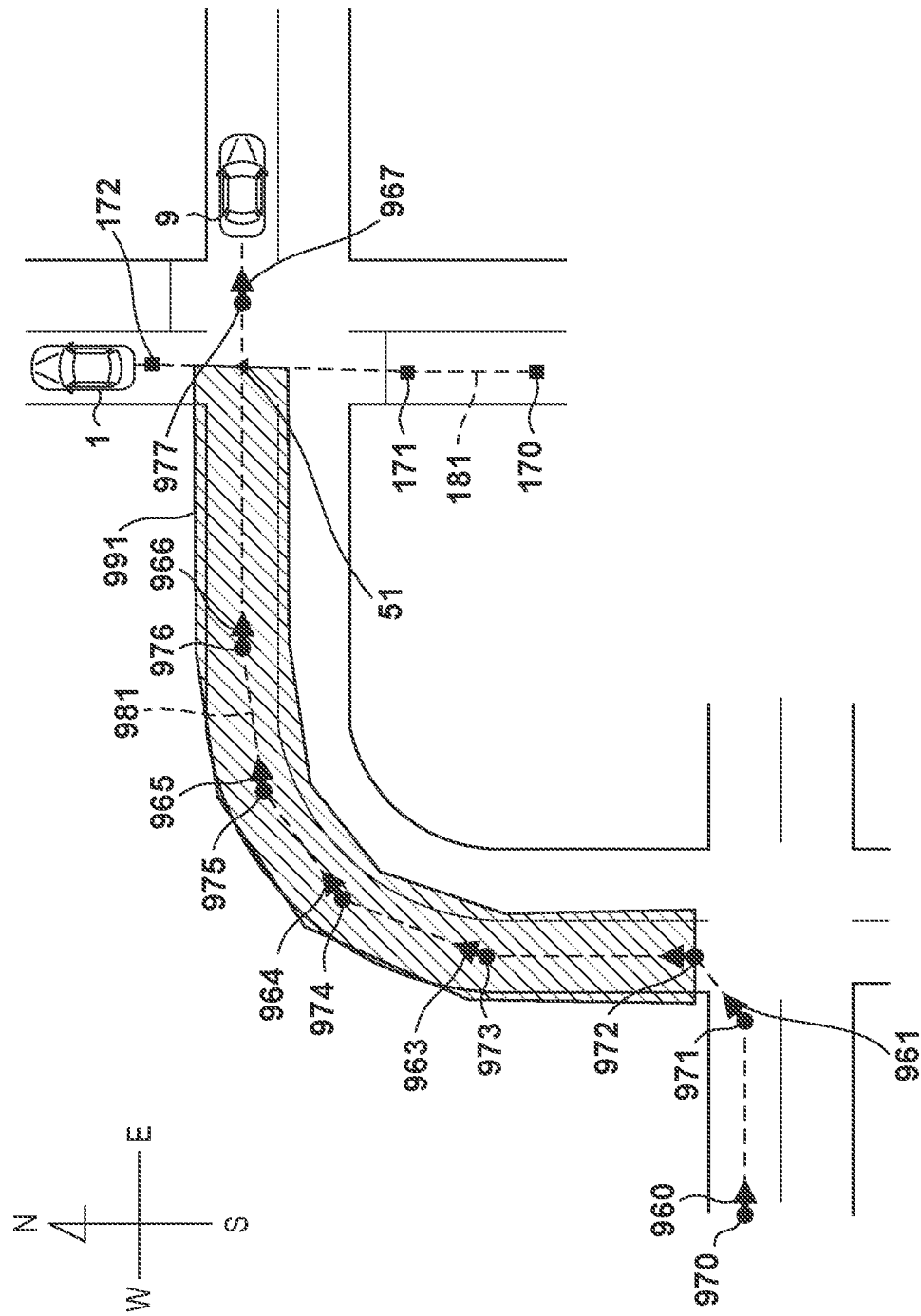
FIG. 6 is a diagram illustrating a situation when the processing of FIG. 5 is performed.

FIG. 5 is a flowchart illustrating a processing example of the processing unit 101, and illustrates a processing example of intersection position registration processing. FIG. 6 is a diagram illustrating a situation when the processing of FIG. 5 is performed. For example, the flowchart of FIG. 5 is implemented by the processing unit 101 reading and executing a program stored in the storage unit 102. In addition, for example, this flowchart is repeatedly performed while the vehicle 1 is traveling, and can be performed in parallel with the processing when performing driving assistance illustrated in FIG. 4A.

In S10, the processing unit 101 acquires data of another vehicle. Furthermore, the processing unit 101 acquires data regarding the travel trajectory of the vehicle 9 from the vehicle 9 which is the other vehicle by vehicle-to-vehicle communication. For example, the vehicle 9, which is the other vehicle, transmits data regarding the travel trajectory to the surrounding vehicle and the like on a predetermined cycle by vehicle-to-vehicle communication. The processing unit 101 receives data regarding the travel trajectory periodically transmitted from the surrounding vehicle 9. FIG. 7A is a diagram illustrating data acquired from another vehicle. In FIG. 7A, data regarding positions 970 to 977 of the vehicle 9 and orientations 960 to 967 of the vehicle 9 at times t0 to t7 is included (see FIG. 6). That is, the data acquired by the processing unit 101 in S10 may include data indicating the position and orientation of another vehicle in time series. Further, in FIG. 7A, data regarding vehicle speeds v0 to v7 of the vehicle 9 and whether or not a turn signal is lighted at the times t0 to t7 is included. That is, the data acquired by the processing unit 101 in S10 may include data regarding whether or not the turn signal of another vehicle is lighted. In addition, the times t0 to t7 do not have to correspond to a constant time interval. For example, when traveling on a curve, the vehicle 9 may acquire and store data regarding the position and orientation at a time interval shorter than that at the time of traveling straight, by using steering angle information or the like. As a result, it is possible to accumulate more accurate data regarding the travel trajectory at the time of traveling on a curve or the like. The processing unit 101 temporarily stores the acquired data in the storage unit 102. Note that the processing unit 101 ends the flowchart in a case where data cannot be acquired from another vehicle due to the absence of another vehicle in the vicinity or the like.

Note that the number of data indicating a position included in data D1 can be appropriately set. In addition, the number of data indicating the position included in the data D1 may vary. For example, in a case where a time at which the data D1 is transmitted by the vehicle 9 is set as a reference time, data indicating a position acquired within a predetermined period up to the reference time may be included in the data D1. As another aspect in which the number of data indicating the position included in the data D1 varies, in a case where a position where the data D1 is transmitted by the vehicle 9 is set as a reference position, the data D1 may include data indicating a position acquired at a position within a predetermined distance from a reference position.

In S11, the processing unit 101 recognizes travel trajectories of the vehicle 1 and the vehicle 9. For example, the processing unit 101 calculates a travel trajectory 981 of the vehicle 9 based on the data acquired in S10. More specifically, the processing unit 101 recognizes the travel trajectory 981 by drawing a straight line connecting the positions 970 to 977 of the vehicle 9 acquired in S11 in time series. In addition, the processing unit 101 calculates a travel trajectory 181 of the self-vehicle based on the data acquired from the GPS module 1031 or the sensor group 11. For example, the processing unit 101 may acquire the data from the GPS module 1031 or the sensor group 11 on a predetermined cycle to recognize the position of the vehicle 1 in time series and calculate the travel trajectory 181 of the vehicle 1. More specifically, the processing unit 101 recognizes the travel trajectory 181 by drawing a straight line connecting acquired positions 170 to 172 of the vehicle 1 in time series.

In S12, the processing unit 101 specifies an intersection position. The processing unit 101 specifies the intersection position of the vehicle 1 and the vehicle 9 based on the travel trajectories of the vehicle 1 and the vehicle 9 recognized in S11. That is, the processing unit 101 specifies the intersection position between the travel trajectory of another vehicle and the travel trajectory of the self-vehicle based on the data acquired in S11. Specifically, the processing unit 101 may specify the intersection position by obtaining coordinates (latitude and longitude) of an intersection between the straight line connecting the positions 970 to 977 of the vehicle 9 acquired in S11 in time series and the straight line connecting the positions 170 to 172 of the vehicle 1 in time series.

In S13, the processing unit 101 proceeds to S14 in a case where the intersection position can be specified in S12, and the processing unit 101 proceeds to S17 in a case where the intersection position cannot be specified.

In S14, the processing unit 101 stores information regarding the specified intersection position in the intersection position DB 1021 of the storage unit 102.

In S15, the processing unit 101 performs data selection processing. More specifically, in a case where the intersection position can be specified in S12, the processing unit 101 selects data for setting a region based on the intersection position and the travel trajectory of the vehicle 9 as the monitoring region when performing driving assistance. At this time, the processing unit 101 selects data obtained by deleting a part of the data acquired in S10 based on the intersection position. Note that details of this step will be described later.

In S16, the processing unit 101 stores the data selected in S15. Furthermore, the processing unit 101 stores the data obtained by partially deleting, in S15, the data temporarily stored in the storage unit 102 in the monitoring region DB 1022 of the storage unit 102 as the monitoring region information. Thereafter, the processing unit 101 ends the flowchart.

In S17, the processing unit 101 deletes the data temporarily stored in the storage unit 102. That is, in a case where the intersection position cannot be specified in S12, the processing unit 101 deletes the entire data acquired in S10. Since data not used for setting the monitoring region is deleted as described above, the amount of data stored in the storage unit 102 can be reduced. Thereafter, the processing unit 101 ends the flowchart.

As described above, since the data obtained by deleting a part of the data acquired in S10 based on the intersection position is selected in S15, the amount of data used for setting the monitoring region in driving assistance can be reduced.

3.2. Example of Data Selection Processing

FIG. 8 is a flowchart illustrating a processing example of the processing unit 101, and illustrates a specific processing example of S15 of FIG. 5.

In S1501, the processing unit 101 acquires an angular difference in orientation from the previous position. More specifically, the processing unit 101 uses the data acquired in S10 to acquire an angular difference between an orientation at each of the positions 971 to 976 and an orientation at an immediately previous position in time series with an intersection position 51 as the start point. Here, FIG. 7B is a diagram illustrating an angular difference between each position of another vehicle and a previous position. For example, since the orientation of the vehicle 9 at the intersection position 51 and the position 976 is 90°, an angular difference in orientation between the position 977 and the previous position is 0°. Further, for example, since the orientation of the vehicle 9 at the position 975 is 80°, an angular difference in orientation between the position 976 and the previous position is 10°. In this manner, the processing unit 101 acquires the angular difference in orientation between each of the positions 971 to 976 and the intersection position 51 and the previous position.

Here, the processing unit 101 may estimate the orientation at the intersection position 51 based on the position 976 and the position 977. For example, the processing unit 101 may set, as the orientation at the intersection position 51, an orientation of a vector with the position 976 as the start point and the position 977 as the end point. Furthermore, the processing unit 101 may estimate the orientation at the intersection position 51 based on a value of an orientation 966 or 967. For example, the processing unit 101 may adopt, as the orientation at the intersection position 51, the orientation 966 at the position 976, which is a data point immediately before the intersection position 51, or the orientation 967 at the position 977, which is a data point immediately after the intersection position 51.

In S1502, the processing unit 101 acquires a cumulative value of an absolute value of the angular difference. More specifically, the processing unit 101 calculates and acquires the cumulative value of the absolute value of the angular difference from the immediately previous position in time series with the intersection position 51 as the start point (FIG. 7B).

In S1503, the processing unit 101 checks whether or not the cumulative value acquired in S1502 exceeds a threshold. In a case where the cumulative value exceeds the threshold, the processing unit 101 proceeds to S1504. In a case where the cumulative value does not exceed the threshold, the processing unit 101 proceeds to S1506. For example, the threshold here may be set in a range of 60° to 210°. Furthermore, the threshold may be set in a range of 90° to 180° or 120° to 150°, or may be set to 135°.

In S1504, the processing unit 101 deletes data for a position previous to a position at which the cumulative value exceeds the threshold. For example, in a case where the threshold is set to 135°, the cumulative value of the absolute value of the angular difference at the position 972 exceeds the threshold. Therefore, the processing unit 101 deletes data (Data Nos. 9000 and 9001 in FIG. 7A) for positions previous to the position 972 from the data acquired from the vehicle 9 and temporarily stored in the storage unit 102.

In S1505, the processing unit 101 selects the remaining data. Furthermore, the processing unit 101 selects data for setting, as the monitoring region when performing driving assistance, the data (Data Nos. 9002 to 9007 in FIG. 7A) not deleted in S1504 from the data acquired from the vehicle 9 and temporarily stored in the storage unit 102. Thereafter, the processing unit 101 ends this flowchart and proceeds to S16 of FIG. 5. Accordingly, the data of Data Nos. 9002 to 9007 in FIG. 7A are registered in the monitoring region DB 1022. Therefore, in this case, a monitoring region 991 of FIG. 6 is set.

On the other hand, when the processing unit 101 proceeds to S1506, the processing unit 101 deletes the entire data acquired from the vehicle 9 and temporarily stored in the storage unit 102. Thereafter, the processing unit 101 ends this flowchart and proceeds to S16 of FIG. 5, but since there is no selected data, the processing unit 101 ends the flowchart of FIG. 5 without storing data in the monitoring region DB 1022.

In this manner, the processing unit 101 deletes a part of the data acquired from the vehicle 9 based on a change in orientation at each of the positions 970 to 977 of the vehicle 9. Since data to be used for setting the monitoring region is selected according to the change in orientation of another vehicle, the amount of data can be reduced while setting the monitoring region more appropriately.

In addition, in the present embodiment, data regarding a position previous to a position at which the cumulative value of the absolute value of the angular difference exceeds the threshold, starting from the intersection position 51, is deleted. Since the data regarding the position previous to the position at which the cumulative value exceeds the threshold is deleted, the amount of data can be reduced while setting the monitoring region more appropriately.

Further, in the present embodiment, since the control device 10 performs driving assistance based on the data acquired in vehicle-to-vehicle communication, it is possible to perform driving assistance of the self-vehicle without using the map information. Then, in a case where the driving assistance of the self-vehicle is performed without using the map information, the amount of data for performing the driving assistance can be reduced.

Note that, in the present embodiment, the processing unit 101 deletes the data regarding the position previous to the position at which the cumulative value of the absolute value of the angular difference exceeds the threshold, but may delete the data regarding the position previous to the position at which the cumulative value of the absolute value of the angular difference exceeds the threshold and the position at which the cumulative value of the absolute value of the angular difference exceeds the threshold.

4. MODIFICATION EXAMPLES

4.1. Modification Examples of Data Selection Processing

4.1.1. Modification Example 1 (FIG. 9)

Figure 9:
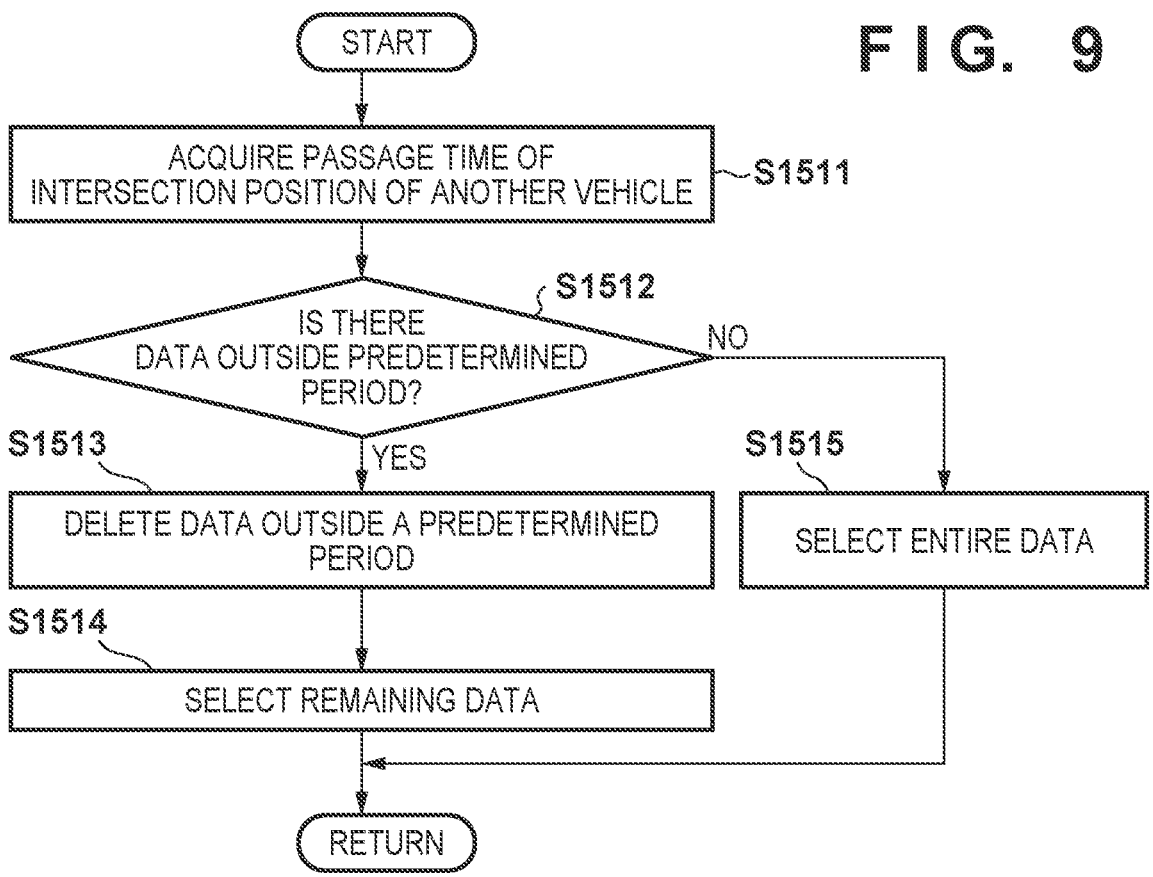
FIG. 9 is a flowchart illustrating a processing example of the processing unit.

FIG. 9 is a flowchart illustrating a processing example of the processing unit 101, and illustrates a specific processing example of S15 of FIG. 5.

In S1511, the processing unit 101 acquires a passage time (hereinafter, the passage time may be referred to as a passage time T) of the vehicle 9, which is another vehicle, at the intersection position 51. For example, the processing unit 101 calculates the passage time T based on the positions including the position 977, the position 976, and the intersection position 51 and the passage times of the vehicle 9 at the position 977 and the position 976.

In S1512, the processing unit 101 checks whether or not there is data outside a predetermined period based on the passage time of the vehicle 9 at the intersection position 51 acquired in S1511. In a case where there is data outside the predetermined period, the processing unit 101 proceeds to S1513, and in a case where there is no data outside the predetermined period, the processing unit 101 proceeds to S1515. For example, the predetermined period may be a period from a time point a predetermined time before the passage time T to the passage time T. The predetermined time may be, for example, several seconds to several 10 seconds.

In S1513, the processing unit 101 deletes the data outside the predetermined period. Furthermore, the processing unit 101 deletes, from the data acquired in S10, data for a time point outside the predetermined period based on the passage time T, which is the time at which the vehicle 9, which is the other vehicle, is positioned at the intersection position 51. A specific description will be given with reference to FIG. 7A. It is assumed that the predetermined period in S1512 is a period from a time point 30 seconds before the passage time T to the passage time T. In addition, it is assumed that the time t3 is 27 seconds before the passage time T and the time t2 is 32 seconds before the passage time T. In such a case, data of Data No. 9003 is data for a time point within the predetermined period, and data of and before Data No. 9002 is data for a time point outside the predetermined period. Therefore, the processing unit 101 deletes the data (Data Nos. 9000 to 9002) of and before Data No. 9002.

In S1514, the processing unit 101 selects the remaining data. That is, the processing unit 101 selects data that has not been deleted in S1513 from the data acquired in S10. For example, in a case where the data (Data Nos. 9000 and 9001) before Data No. 9002 is deleted in S1513, the processing unit 101 selects data (Data Nos. 9002 to 9007) of or after Data No. 9002.

In S1515, the processing unit 101 selects the entire data. That is, in a case where the entire data acquired in S10 has been acquired at a time point within the predetermined period, the processing unit 101 selects the entire data acquired in S10.

As described above, according to this modification example, since data for a time point outside the predetermined period is deleted, it is possible to reduce the amount of data while setting the monitoring region more appropriately.

4.1.2. Modification Example 2 (FIG. 10)

Figure 10:
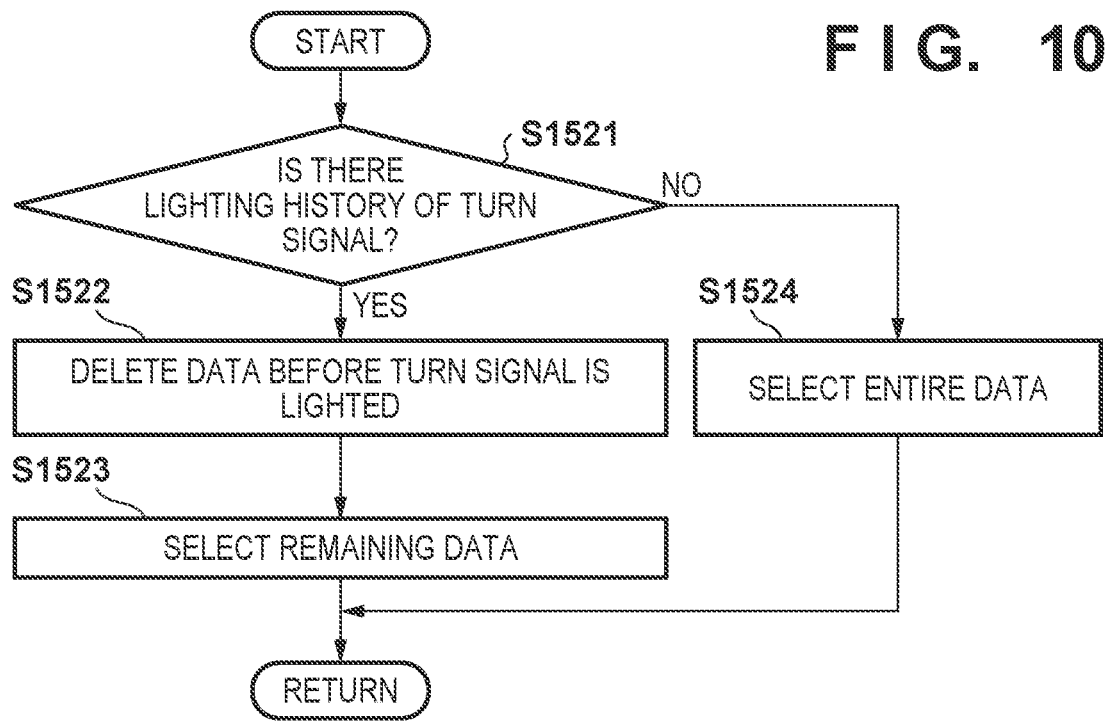
FIG. 10 is a flowchart illustrating a processing example of the processing unit.

FIG. 10 is a flowchart illustrating a processing example of the processing unit 101, and illustrates a specific processing example of S15 of FIG. 5.

In S1521, the processing unit 101 checks whether or not the data acquired from the vehicle 9, which is the other vehicle, in S10 includes a lighting history of the turn signal. In a case where the data includes the lighting history, the processing unit 101 proceeds to S1522. In a case where the data does not include the lighting history, the processing unit 101 proceeds to S1524. In the example of FIG. 7A, since there is a history showing that the left turn signal of the vehicle 9 is lighted at the position 971, the processing unit 101 proceeds to S1522.

In S1522, the processing unit 101 deletes data before the turn signal is lighted from the data acquired in S10. In the example of FIG. 7A, since Data No. 9001 includes data indicating that the turn signal is lighted, the processing unit 101 deletes data of Data No. 9000 that is data before the turn signal is lighted. In the present embodiment, data before the turn signal is lighted is deleted, but data when the turn signal is lighted may also be deleted. That is, the data of Data No. 9001 in the example of FIG. 7A may also be deleted.

In S1523, the processing unit 101 selects the remaining data. That is, the processing unit 101 selects data that has not been deleted in S1522 from the data acquired in S10. For example, in a case where the data of Data No. 9000 is deleted in S1522, the processing unit 101 selects data (Data Nos. 9001 to 9007) of and after Data No. 9001.

In S1524, the processing unit 101 selects the entire data. That is, in a case where the data acquired in S10 does not include the data indicating that the turn signal is lighted, the processing unit 101 selects the entire data acquired in S10.

According to this embodiment, since the data before the turn signal is lighted is deleted, it is possible to reduce the amount of data while setting the monitoring region more appropriately.

4.2. Modification Example of Intersection Position Registration Processing

4.2.1. Modification Example 1 (FIG. 11)

Figure 11:
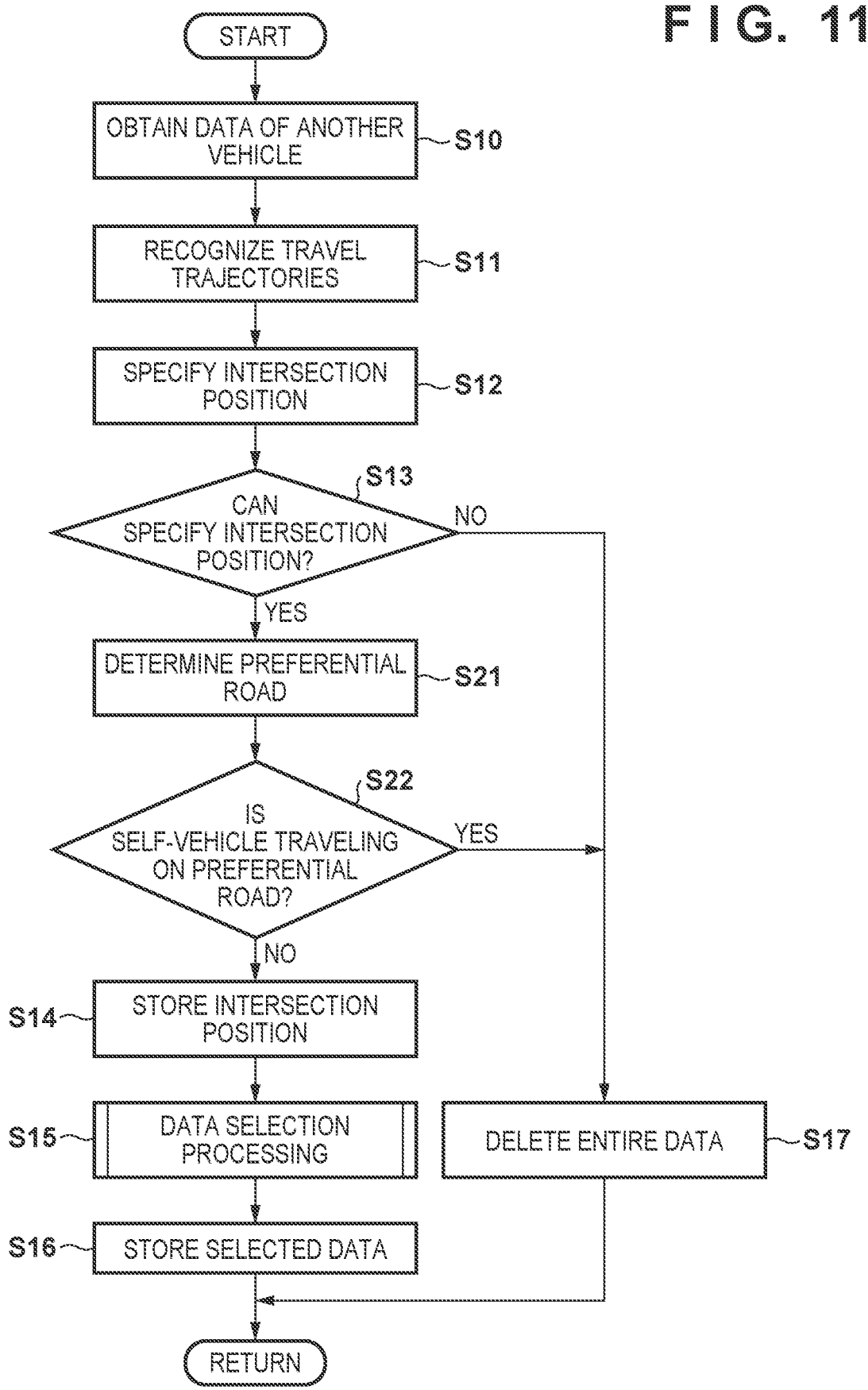
FIG. 11 is a flowchart illustrating a processing example of the processing unit.

FIG. 11 is a flowchart illustrating a processing example of the processing unit 101, and illustrates a processing example of the intersection position registration processing. Hereinafter, the same processing as that in the flowchart of FIG. 5 is denoted by the same reference sign, and a description thereof is omitted.

At the branch of S13, in a case where the intersection position can be specified in S12, the processing unit 101 proceeds to S21.

In S21, the processing unit 101 performs preferential road determination. More specifically, in a case where the intersection position can be specified in S12, the processing unit 101 determines whether or not a road on which the vehicle 1, which is the self-vehicle, has been traveling is a preferential road. The processing unit 101 may determine whether or not the road on which the vehicle 1 has been traveling is the preferential road based on a travel history of the vehicle 1 which is the self-vehicle. For example, when the vehicle 1 stops before the intersection position, the processing unit 101 determines that the road on which the vehicle 1 has been traveling is not the preferential road. As a result, the processing unit 101 can determine the preferential road according to the travel history of the self-vehicle. In addition, the processing unit 101 may determine whether or not the road on which the vehicle 1 has been traveling is the preferential road based on a surrounding situation of the intersection position. For example, the processing unit 101 may determine whether or not the road on which the vehicle 1 has been traveling is the preferential road by recognizing a stop line or a sign, comparing a vehicle width between a traveling road and a crossroad, and the like based on the detection result of the outside detection sensor included in the sensor group 11.

In S22, based on the determination result in S21, the processing unit 101 proceeds to S14 in a case where the vehicle 1, which is the self-vehicle, is not traveling on the preferential road, and the processing unit 101 proceeds to S17 in a case where the vehicle 1 is traveling on the preferential road. As a result, in a case where it is determined in S21 that the road on which the vehicle 1, which is the self-vehicle, has been traveling is not the preferential road, the processing unit 101 deletes, in S15, a part of the data acquired from the vehicle 9 in S10. On the other hand, in a case where it is determined in S21 that the road on which the vehicle 1, which is the self-vehicle, has been traveling is the preferential road, the processing unit 101 deletes, in S17, the entire data acquired from the vehicle 9 in S10.

According to this modification example, since the monitoring region is not set in a case where the self-vehicle is traveling on the preferential road, it is possible to suppress the driving assistance from being performed in a situation where the necessity of the driving assistance is low. In addition, since the monitoring region is not set in a region where the necessity of the driving assistance is low, the amount of data stored in the storage unit 102 can be reduced.

4.2.2. Modification Example 2 (FIG. 12)

Figure 12:
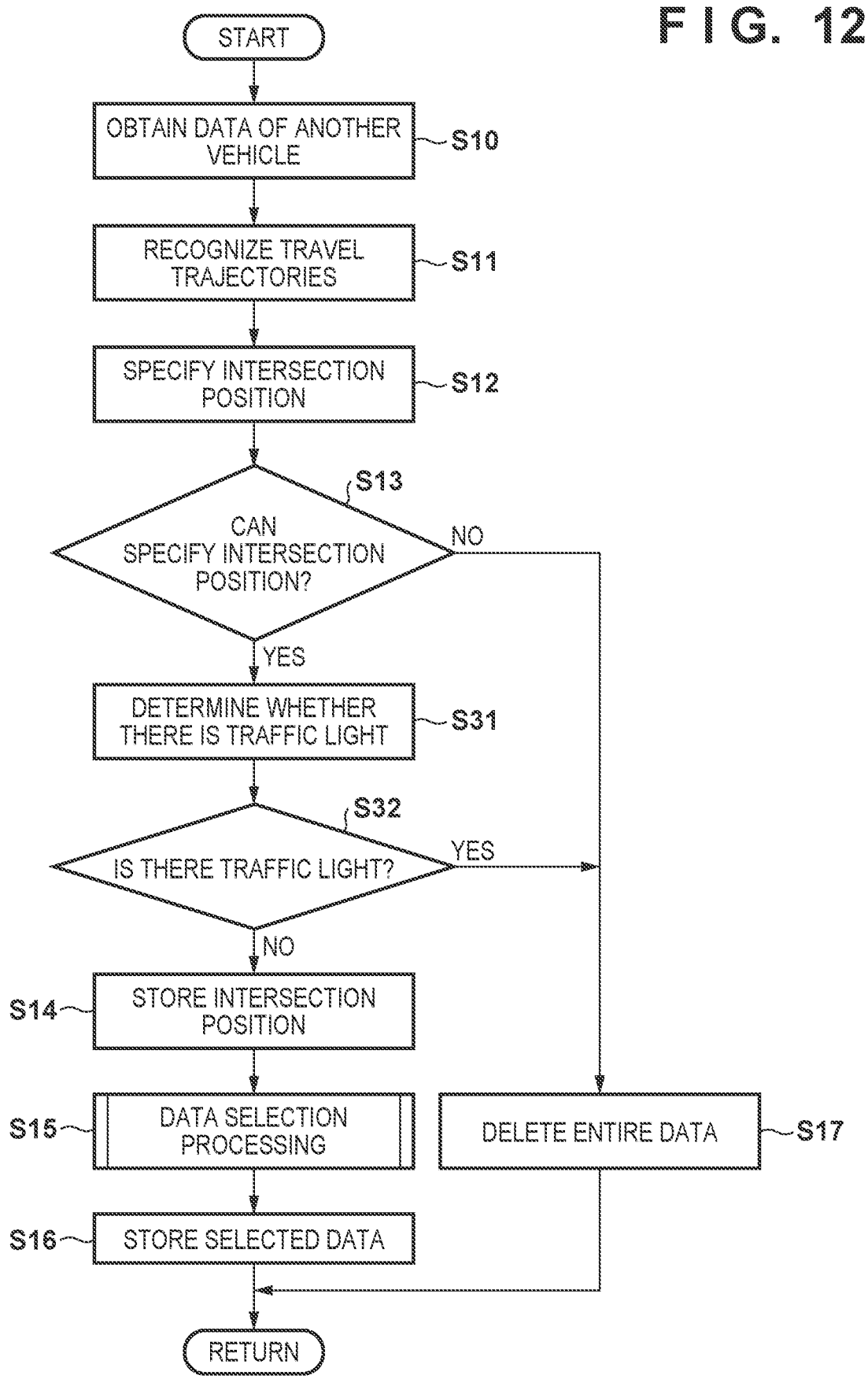
FIG. 12 is a flowchart illustrating a processing example of the processing unit.

FIG. 12 is a flowchart illustrating a processing example of the processing unit 101, and illustrates a processing example of the intersection position registration processing. Hereinafter, the same processing as that in the flowchart of FIG. 5 is denoted by the same reference sign, and a description thereof is omitted.

At the branch of S13, in a case where the intersection position can be specified in S12, the processing unit 101 proceeds to S21.

In S31, the processing unit 101 determines whether or not there is a traffic light. More specifically, in a case where the intersection position can be specified in S12, the processing unit 101 determines whether or not the traffic light is provided at the specified intersection position. The processing unit 101 may determine whether or not there is a traffic light at the intersection position based on the detection result of the outside detection sensor included in the sensor group 11.

In S32, in a case where it is determined in S31 that there is no traffic light at the intersection position, the processing unit 101 proceeds to S14, and in a case where it is determined in S31 that there is a traffic light at the intersection position, the processing unit 101 proceeds to S17. Therefore, in a case where it is determined in S31 that the traffic light is not provided at the intersection position, in S15, the processing unit 101 deletes a part of the data acquired from the vehicle 9 in S10. On the other hand, in a case where it is determined in S31 that the traffic light is provided at the intersection position, the processing unit 101 deletes the entire data acquired from the vehicle 9 in S10.

According to this embodiment, since the monitoring region is not set in a case where the traffic light is provided at the intersection position, it is possible to suppress the driving assistance from being performed in a situation where the necessity of the driving assistance is low. In addition, since the monitoring region is not set in a region where the necessity of the driving assistance is low, the amount of data stored in the storage unit 102 can be reduced.

5. Other Embodiments

In the above-described embodiment, the control device 10 functioning as the driving assistance device is mounted on the four-wheeled vehicle 1, but the control device 10 may be mounted on another type of vehicle capable of traveling on a road, such as a straddled vehicle or a work machine.

6. Summary of Embodiments

The embodiments described above disclose at least the following driving assistance device, vehicle, and driving assistance method.

1. A driving assistance device (10) in the above embodiments comprising:
   an acquisition unit (101, S10) configured to acquire data regarding a travel trajectory of another vehicle from the other vehicle by vehicle-to-vehicle communication;
   a specifying unit (101, S12) configured to specify an intersection position between the travel trajectory of the other vehicle and a travel trajectory of a self-vehicle based on the data acquired by the acquisition unit; and
   a selection unit (101, S15) configured to select data for setting a region based on the intersection position and the travel trajectory of the other vehicle as a monitoring region when performing driving assistance in a case where the intersection position is specifiable by the specifying unit,
   wherein the selection unit selects data that has been partially deleted from the data acquired by the acquisition unit based on the intersection position.

According to this embodiment, since the data obtained by deleting a part of the data acquired by the acquisition unit based on the intersection position is selected, it is possible to reduce the amount of data used for setting the monitoring region for another vehicle in driving assistance.

2. According to the above embodiments, the driving assistance device further comprises a deletion unit (101, S16) configured to delete the entire data acquired by the acquisition unit in a case where the intersection position is not specifiable by the specifying unit.

According to this embodiment, since data not used for setting the monitoring region is deleted, it is possible to reduce the amount of data stored in the device.

3. According to the above embodiments, the data acquired by the acquisition unit includes data indicating a position and an orientation of the other vehicle in time series, and
   the selection unit deletes a part of the data acquired by the acquisition unit based on a change of the orientation (S1504).

According to this embodiment, since data to be used for setting the monitoring region is selected according to the change in orientation of another vehicle, it is possible to reduce the amount of data while setting the monitoring region more appropriately.

4. According to the above embodiments, the selection unit acquires an angular difference in orientation between each position of the other vehicle and an immediately previous position in time series, and deletes data regarding a position previous to a position at which a cumulative value of an absolute value of the angular difference exceeds a threshold, starting from the intersection position (S1504).

According to this embodiment, since the data regarding the position previous to the position at which the cumulative value exceeds the threshold is deleted, it is possible to reduce the amount of data while setting the monitoring region more appropriately.

5. According to the above embodiments, the selection unit deletes, from the data acquired by the acquisition unit, data for a time point outside a predetermined period based on a time point at which the other vehicle is positioned at the intersection position (S1513).

According to this embodiment, since the data for the time point outside the predetermined period is deleted, it is possible to reduce the amount of data while setting the monitoring region more appropriately.

6. According to the above embodiments, the data acquired by the acquisition unit includes data regarding whether or not a turn signal of the other vehicle is lighted, and the selection unit deletes data before the turn signal is lighted from the data acquired by the acquisition unit (S1522).

According to this embodiment, since the data before the turn signal is lighted is deleted, it is possible to reduce the amount of data while setting the monitoring region more appropriately.

7. According to the above embodiments, the driving assistance device further comprising an assistance unit (101, S94) configured to perform the driving assistance in a case where another vehicle is present in the monitoring region.

According to this embodiment, it is possible to perform the driving assistance based on the set monitoring region.

8. According to the above embodiments, the assistance unit makes a notification for an occupant of the self-vehicle as the driving assistance (S94).

According to this embodiment, it is possible to urge the occupant to grasp the surrounding situation of the self-vehicle.

9. According to the above embodiments, the driving assistance device further comprises a first determination unit (101, S21) configured to determine whether or not a road on which the self-vehicle has been traveling is a preferential road in a case where the intersection position is specifiable by the specifying unit, wherein in a case where the first determination unit determines that the road on which the self-vehicle has been traveling is not the preferential road, the selection unit deletes a part of the data acquired by the acquisition unit (S15), and in a case where the first determination unit determines that the road on which the self-vehicle has been traveling is the preferential road, the deletion unit deletes the entire data acquired by the acquisition unit (S17).

According to this embodiment, since the monitoring region is not set in a case where the self-vehicle is traveling on the preferential road, it is possible to suppress the driving assistance from being performed in a situation where the necessity of the driving assistance is low.

10. According to the above embodiments, the first determination unit determines that the road on which the self-vehicle has been traveling is not the preferential road in a case where the self-vehicle stops before the intersection position (S21).

According to this embodiment, it is possible to determine the preferential road according to the travel history of the self-vehicle.

11. According to the above embodiments, the driving assistance device further comprises a second determination unit (S101, S31) configured to determine whether or not a traffic light is provided at the intersection position, wherein in a case where the second determination unit determines that a traffic light is not provided at the intersection position, the selection unit deletes a part of the data acquired by the acquisition unit (S15), and in a case where the second determination unit determines that a traffic light is provided at the intersection position, the deletion unit deletes the entire data acquired by the acquisition unit (S17).

According to this embodiment, since the monitoring region is not set in a case where the traffic light is provided, it is possible to suppress the driving assistance from being performed in a situation where the necessity of the driving assistance is low.

12. According to the above embodiments, the driving assistance device further comprises a storage unit (102) configured to store the data selected by the selection unit.

According to this embodiment, it is possible to store data selected by the selection unit.

13. According to the above embodiments, the driving assistance of the self-vehicle is performed without using map information.

According to this embodiment, it is possible to perform the driving assistance based on travel data of the self-vehicle and travel data acquired from another vehicle by vehicle-to-vehicle communication without using map information.

14. A vehicle (1) in the above embodiments mounts the driving assistance device in the above embodiments.

According to this embodiment, there is provided a vehicle on which the driving assistance device capable of reducing the amount of data used for setting the monitoring region for another vehicle in the driving assistance is mounted.

15. A driving assistance method in the above embodiments comprising:

acquiring (S10) data regarding a travel trajectory of another vehicle from the other vehicle by vehicle-to-vehicle communication;

specifying (S12) an intersection position between the travel trajectory of the other vehicle and a travel trajectory of a self-vehicle based on the data acquired in the acquiring; and selecting (S15) setting data for setting a region based on the intersection position and the travel trajectory of the other vehicle as a monitoring region when performing driving assistance in a case where the intersection position is specifiable in the specifying, wherein, in the selecting, data that has been partially deleted from the data acquired in the acquiring based on the intersection position is selected.

According to this embodiment, since the data obtained by deleting a part of the data acquired by the acquisition unit based on the intersection position is selected, it is possible to reduce the amount of data used for setting the monitoring region for another vehicle in driving assistance.

The invention is not limited to the foregoing embodiments, and various variations/changes are possible within the spirit of the invention.

What is claimed is:

1. A driving assistance device mounted on a first vehicle comprising a processor and a storage device, the storage device storing a program executable by the processor to perform:

acquiring data regarding a travel trajectory of second vehicle from the second vehicle by vehicle-to-vehicle communication;

specifying an intersection position between the travel trajectory of the second vehicle and a travel trajectory of the first vehicle based on the data acquired in the acquiring;

selecting first data and second data from the data acquired in the acquiring in a case where the intersection position is specifiable in the specifying, the first data being data for setting a region based on the intersection position and the travel trajectory of the second vehicle as a monitoring region when performing driving assistance, and the second data being data to be deleted; and deleting the entire data acquired in the acquiring in a case where the intersection position is not specifiable in the specifying.

2. A driving assistance device mounted on a first vehicle comprising a processor and a storage device, the storage device storing a program executable by the processor to perform:
acquiring data regarding a travel trajectory of second vehicle from the second vehicle by vehicle-to-vehicle communication;
specifying an intersection position between the travel trajectory of the second vehicle and a travel trajectory of the first vehicle based on the data acquired in the acquiring;
selecting first data and second data from the data acquired in the acquiring in a case where the intersection position is specifiable in the specifying, the first data being data for setting a region based on the intersection position and the travel trajectory of the second vehicle as a monitoring region when performing driving assistance, and the second data being data to be deleted; and
deleting the entire data acquired in the acquiring in a case where a traffic condition around the first vehicle satisfies a predetermined condition.

3. The driving assistance device according to claim 1, wherein the data acquired in the acquiring includes data indicating a position and an orientation of the second vehicle in time series, and
in the selecting, the second data are selected based on a change of the orientation.

4. The driving assistance device according to claim 3, wherein in the selecting, an angular difference in orientation between each position of the second vehicle and an immediately previous position in time series is acquired, and data regarding a position previous to a position at which a cumulative value of an absolute value of the angular difference exceeds a threshold, starting from the intersection position are selected as the second data.

5. The driving assistance device according to claim 1, wherein in the selecting, from the data acquired in the acquiring, data for a time point outside a predetermined period based on a time point at which the second vehicle is positioned at the intersection position are selected as the second data.

6. The driving assistance device according to claim 1, wherein the data acquired in the acquiring includes data regarding whether or not a turn signal of the ether second vehicle is lighted, and
in the selecting, data before the turn signal is lighted from the data acquired in the acquiring are selected as the second data.

7. The driving assistance device according to claim 1, wherein the processor executes the program to perform a driving assistance in a case where a third vehicle is present in the monitoring region.

8. The driving assistance device according to claim 7, wherein the driving assistance includes a notification for an occupant of the first vehicle.

9. The driving assistance device according to claim 1, wherein the processor executes the program to perform determining whether or not a road on which the first vehicle has been traveling is a preferential road in a case where the intersection position is specifiable in the specifying,
wherein in a case where it is determined that the road on which the first vehicle has been traveling is not the preferential road, the second data are deleted, and in a case where it is determined that the road on which the first vehicle has been traveling is the preferential road, the entire data acquired in the acquiring is deleted.

10. The driving assistance device according to claim 9, wherein it is determined that the road on which the first vehicle has been traveling is not the preferential road in a case where the first vehicle stops before the intersection position.

11. The driving assistance device according to claim 1, wherein the processor executes the program to perform determining whether or not a traffic light is provided at the intersection position,
wherein in a case where it is determined that a traffic light is not provided at the intersection position, the second data are deleted, and
in a case where it is determined that a traffic light is provided at the intersection position, the entire data acquired in the acquiring is deleted.

12. The driving assistance device according to claim 1, the first data selected in the selecting are stored.

13. The driving assistance device according to claim 7, wherein the driving assistance is performed without using map information.

14. A vehicle on which the driving assistance device according to claim 1 is mounted.

15. A driving assistance method for a first vehicle comprising:
acquiring data regarding a travel trajectory of second vehicle from the second vehicle by vehicle-to-vehicle communication;
specifying an intersection position between the travel trajectory of the second vehicle and a travel trajectory of a the first vehicle based on the data acquired in the acquiring;
selecting first data and second data from the data acquired in the acquiring in a case where the intersection position is specifiable in the specifying, the first data being data for setting a region based on the intersection position and the travel trajectory of the second vehicle as a monitoring region when performing driving assistance, and the second data being data to be deleted; and
deleting the entire data acquired in the acquiring in a case where the intersection position is not specifiable in the specifying.

16. A driving assistance device mounted on a first vehicle comprising a processor and a storage device, the storage device storing a program executable by the processor to perform:
acquiring data regarding a travel trajectory of second vehicle from the second vehicle by vehicle-to-vehicle communication;
specifying an intersection position between the travel trajectory of the second vehicle and a travel trajectory of the first vehicle based on the data acquired in the acquiring; and
selecting first data and second data from the data acquired in the acquiring in a case where the intersection position is specifiable in the specifying, the first data being data for setting a region based on the intersection position and the travel trajectory of the second vehicle as a monitoring region when performing driving assistance, and the second data being data to be deleted,
wherein in the selecting, the second data are selected based on the intersection position and contents of the data acquired in the acquiring.

* * * * *